April 4, 1967     J. A. FINGERETT     3,312,897
MONITORING CIRCUIT HAVING METER WITH INDEPENDENTLY VARIABLE
SCALE LIMITS AND PROVIDING SIMULTANEOUS VARIABLE
NULL AND SENSITIVITY ADJUSTMENTS
Filed Oct. 4, 1963
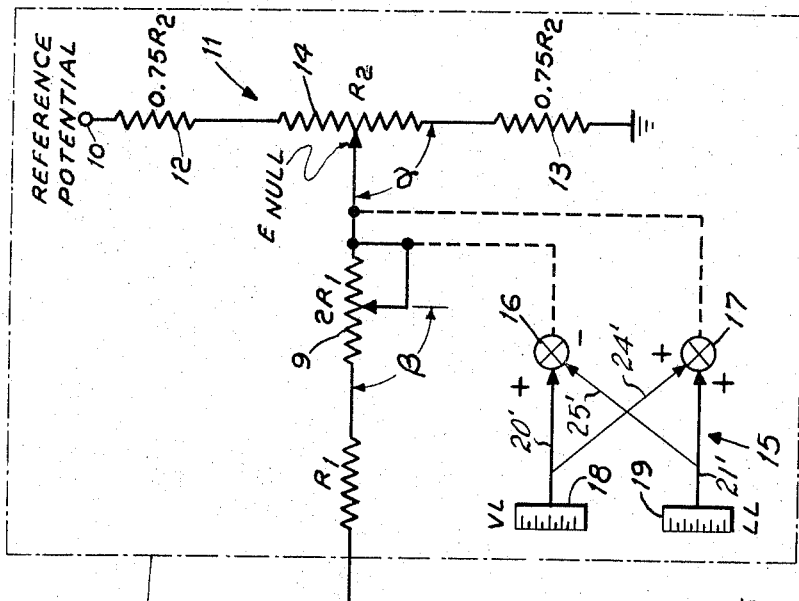
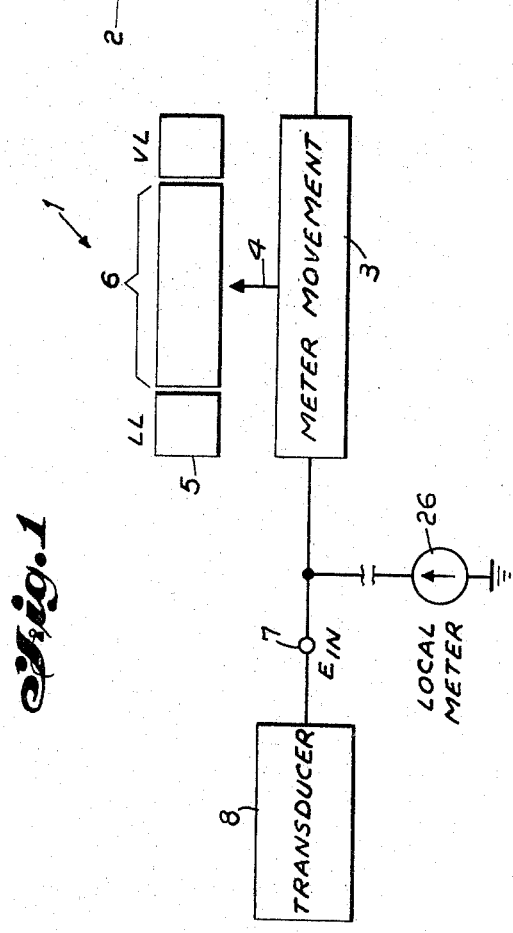
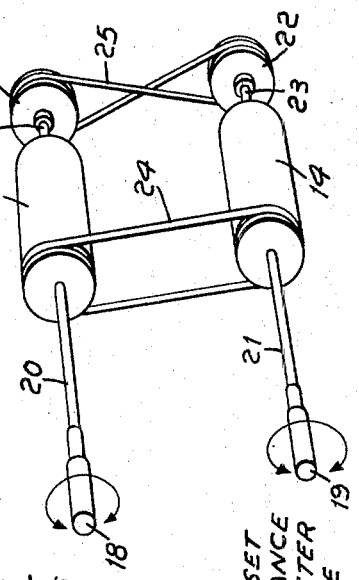
INVENTOR.
JOSEPH A. FINGERETT
BY
*Percy P. Lantry*
ATTORNEY

United States Patent Office 3,312,897
Patented Apr. 4, 1967

3,312,897
MONITORING CIRCUIT HAVING METER WITH INDEPENDENTLY VARIABLE SCALE LIMITS AND PROVIDING SIMULTANEOUS VARIABLE NULL AND SENSITIVITY ADJUSTMENTS
Joseph A. Fingerett, Van Nuys, Calif., assignor to International Telephone and Telegraph Corporation, Nutley, N.J., a corporation of Maryland
Filed Oct. 4, 1963, Ser. No. 313,991
8 Claims. (Cl. 324—115)

This invention relates to monitoring devices and more particularly to circuit arrangements for use with such devices which permit the independent variation of the upper and lower limits of the monitoring devices, while maintaining a fixed length of scale therebetween, the gradations of which bear a linear relationship to each other regardless of the values chosen for the upper and lower limits of the scale.

There are many instances where it is desired to monitor variations in physical parameters. Very often, physical parameters are monitored under different ambient conditions, so that, what might be a normal operating range under one set of conditions is no longer normal under another set of conditions. Under such circumstances, scale factors on monitoring devices have to be changed or the monitoring devices themselves have to be replaced. Changes in scale factor and replacement of meters and the like often require mental reorientation and interpolation on the part of an observer which, when overlooked, lead to error and waste. Also, a certain amount of training and skill is required to properly interpret the readings of monitoring devices even when the same type of physical parameter is being observed. When, however, many physical parameters, each different from the other, are being monitored, the possible sources of error are increased since a number of scale factors, nonlinearities of scales, parallex and other such factors must be taken into consideration.

These difficulties become particularly aggravating when the monitoring device is being utilized to monitor a normal range of variation in some physical parameters. Under changing conditions, the scale factors may change and even the normal operating range may change requiring mental interpolations of possibly nonlinear scales and the memorizing of upper and lower limits of the new normal operating range. Where a multiplicity of physical parameters must be monitored, the problem becomes practically insuperable thereby limiting the number of physical parameters which can be readily measured at one time. There appears, therefore, to be a necessity for a monitoring device which will obviate the above-mentioned difficulties and make possible the monitoring of a greater number of physical parameters than has heretofore been possible. Such a monitoring device would be particularly necessary and useful where an observer is seeking to monitor departures from the normal range of operation.

It is, therefore, an object of this invention to provide a circuit arrangement for monitoring devices which overcomes the observational difficulties present in prior art monitoring devices.

Another object is to provide a circuit arrangement which permits the independent adjustment of the values of upper and lower limits on a fixed monitor scale.

A further object is to provide a circuit arrangement which permits the monitor indicator to be displaced in a linear manner between the upper and lower limits regardless of the value of said upper and lower limits.

A feature of this invention is the utilization of a monitoring device having a fixed scale in which means for adjusting the null position of the monitoring device to a value equal to the average value of an electrical signal amplitude is provided. In addition, means for adjusting the sensitivity of the monitoring device is provided such that a given linear deflection is obtained for a plurality of maximum and minimum value of signal excursion.

Another feature of this invention is the provision of means for simultaneously adjusting the sensitivity and current flow through a monitoring device such that for a fixed allowable deflection, a plurality of maximum and minimum value of signal excursion is accommodated.

Still another feature of this invention is the provision of differential apparatus which includes first and second differentials which are adapted to simultaneously vary the null voltage from a potentiometer and the current flow through a resistor so that the sensitivity of the monitoring device varies inversely with the amplitude of the incoming signal.

The above-mentioned and other features and objects of this invention will become more apparent by reference to the following description taken in conjunction with the accompanying drawings, in which:

FIG. 1 is a schematic diagram of a circuit for varying the null and sensitivity conditions of an associated monitoring device such as an ammeter according to this invention; and FIG. 2 is a specific embodiment of a differential arrangement shown schematically in FIG. 1 which permits the simultaneous variation of sensitivity and null voltage devices in accordance with the teaching of this invention.

Referring now to FIG. 1, there is shown schematically a monitoring device 1 and, within the dotted lines, an associated circuit 2 for adjusting the null voltage and sensitivity of device 1 in accordance with this invention. Monitoring device 1 consists of a meter movement 3 and its associated indicator or pointer 4; a scale 5 having lower limit and upper limit markings designated LL and UL, respectively; and a region of fixed length 6 disposed between the limit markings. An analog signal $E_{in}$ is applied to meter movement 3 at terminal 7 from a transducer 8. Transducer 8 may be any one of a number of well known transducing devices which are used to measure changes in the physical parameters of systems; the condition of which is being monitored to detect departures from normal or standard operating conditions. Such systems may include, electrical, mechanical or chemical systems and particularly, biochemical systems such as the human body. Thus, parameters, such as heart rate, respiration, temperature and blood pressure may be monitored.

As indicated hereinabove, one of the main difficulties in observing changes in physical parameters is detecting departures from normal ranges of operation particularly when the ranges vary due to changes in ambient conditions or due to changes within the system being monitored which expand or contract the normal ranges of operation. Often to detect small changes which indicate incipient failure of a system under stress conditions, monitoring devices of insufficient sensitivity must be replaced with devices of the required sensitivity and linearity leading to the maintenance of expensive stand-by devices and time consumption during replacement. The circuit 2 of FIG. 1 eliminates the need for stand-by monitors and loss of time by providing for the immediate adjustment of sensitivity and null voltage and additionally provides a display which always varies linearly between upper and lower limits over a constant length of scale.

Circuit 2 includes a variable resistance 9, the independent variation of which adjusts the sensitivity of monitoring device 1. A source of reference potential 10 is coupled to a voltage divider network, shown generally at 11, which includes fixed resistors 12, 13 and variable potentiometer 14. Potentiometer 14 is adapted to pickoff voltages, within the maximum average range of normal values expected to be provided by the transducer 8. As will be seen from an analysis to be given hereinafter, the voltage provided by potentiometer 14, should be equal to the average value of the expected variation $E_{in}$ thereby providing zero current flow through meter movement 3 and the consequent centering of pointer 4 between UL and LL. It should be clear that by appropriately adjusting the values of variable resistance 9 and potentiometer 14 that a monitoring device sensitivity can be obtained which varies inversely with the value of the average value of the input signal. Thus, if the normal value of the input signal ($E_{in}$) variation is large, the sensitivity of the monitoring device 1 should be low and if the normal value of the input signal is small, the sensitivity of the monitoring device 1 should be high. The foregoing statements broadly take in the consideration, the situation where both the upper and lower limit are increased or decreased by the same amount, but may not suggest what occurs when only one of the limits is changed or when the limits are changed by different amounts. Changing the limits as last suggested can be undertaken with the circuit arrangement of FIG. 1 without any problem since the value of voltage provided by potentiometer 14 will always cause zero current to flow in meter movement 3 whenever the transducer signal (7) is midway between the upper and lower limits thereby causing indicator 5 to assume a position at the midpoint of scale 5. The input signal will then cause current to flow in the meter movement 3 which is representative of the departure from the average at the instant of sampling. Since sensitivity of the monitoring device 1 is inversely proportional to the value of the incoming signal, differential means, shown generally at 15, have been provided consisting of first and second differentials shown schematically at 16 and 17 respectively.

The differential arrangement 15 is a representation of the apparatus shown in FIGURE 2 in that a variation in the upper limits 18 setting causes a change in both the variable resistance 9 and the potentiometer 14. Varying the lower limit 19 setting will also result in changes in items 9 and 14. So that line 20' shown in FIGURE 1 is equivalent to 20 shown in FIGURE 2, line 21' is equivalent to 21, 24' is equivalent to 24, and 25' of FIGURE 1 is equivalent to 25 of FIGURE 2. The significance of the + and − in connection with differentials 16 and 17 is simply the direction of rotations. So that an increase in the value of the upper limit 18 causes an increase of $\alpha$ and $\beta$ of 14 and 9, and an increase in the lower limit 19 causes an increase in $\alpha$ and a decrease in $\beta$. The relation, as shown in FIGURE 2, is that if both upper and lower limits are raised by the same amount there will be no net motion of the wiper arm relative to the body of variable resistance 9.

Differentials 16 and 17 are actuated by limit set control means 18 and 19 respectively, which may be thumbwheels, knobs, or the like. The differentials 16 and 17 are mechanically coupled to variable resistance 9 and potentiometer 14 and movement of the thumbwheels 18 and 19 which have been calibrated previously set the values which are to be assigned to UL and LL on monitor scale 5. From this, it may be seen that no numerical values need be assigned to UL and LL on scale 5, since only a departure from the normal range 6 need be detected. A person observing monitoring devices does not know, therefore, that the heartbeat rate is 100 per minute but merely that the particular physical parameter has departed from a previously set normal range.

Further consideration of differentials 16 and 17 indicates that movement of thumbwheel 18 causes variable resistance 9 and potentiometer 14 to move in opposite directions or to act subtractively. Thus, any increase in the value of UL (increasing the normal range) acts to increase the value of the voltage picked off from potentiometer 14 and decreases the sensitivity of device 1 by appropriately adjusting the resistance of variable resistance 9. Also, any increase in the value of LL (decrease in the normal range) increases the value of voltage picked off from potentiometer 14 and increases the sensitivity. Therefore, adjusting thumbwheels 18 and 19 in the same direction will cause the value of the voltage picked off from potentiometer 14 to change even though the magnitude of the normal range between UL and LL does not change and will cause the sensitivity of monitoring device 1 to remain unchanged since the differentials 15 and 16 act in opposite directions and offset one another. For example, if UL is changed from value 10 to value 8 and LL is changed from value 4 to value 2 the range between UL and LL remains 6 units, but the average value of the voltage from potentiometer 14 has changed from an average value of 7 to an average value of 5. Since the range has remained unchanged, no change in sensitivity is required and the differentials act in opposite directions to cancel the motion of one with the motion of the other.

Referring now to FIG. 2, an embodiment of a differential arrangement is shown which causes variable resistance 9 and potentiometer 14 to track simultaneously in the manner described above. Thumbwheel 18 is connected by means of shaft 20 to the wiper (not shown) of variable resistance 9, and thumbwheel 19 is connected by shaft 21 to the body of variable potentiometer 14. Pulleys 22 are connected by means of shafts 23 to the wipers of variable devices 9 and 14. The bodies of variable devices 9 and 14 are connected with a belt 24 such that when thumbwheel 19 is rotated, the body of potentiometer 14 is rotated and the body of resistance 9 is rotated in the same direction. Belt 25 is shown interconnecting pulleys 22 such that the rotation of thumbwheel 18 causes the wipers of variable devices 9 and 14 to rotate in opposite directions.

In operation, the values of UL and LL can be set prior to attaching a transducer to the system being monitored and the indicator of the monitoring device will be set at the midpoint of the monitor scale, reading it to be transmitted to a remote meter similar to monitoring device 1. The midpoint on the remote meter is set when zero current flow thru the meter and this situation is attained when the variable function ($E_{in}$) is midway between the upper and lower limits.

Referring again to FIG. 1, the local meter is shown at 26 and potentiometer 14 is designated $R_2$ and resistance 9 is designated as $2R_1$. The other designations will become self explanatory as the analysis proceeds. As indicated, hereinabove, $R_2$ provides a variable offset or null voltage and by driving $R_2$ through a differential in an additive manner from either thumbwheel, the desired offset or null voltage can be obtained. If $\alpha$ is the percentage of $R_2$ taken from the bottom of $R_2$ and the upper and lower limits in volts are considered, the differential relationship should be:

$$\alpha = \frac{(UL)+(LL)-6}{8}$$

The transducer may then be attached to the system being monitored and the input signal impressed on the meter movement of the monitoring device. It is also possible to change the values of UL and LL while a signal value is being indicated on the scale. The indicator of the monitoring device merely assumes a new position on the scale which is in the same proportion to the new range between upper and lower limits as it was to the upper and lower limits prior to changing the limits.

The following analysis will indicate the theoretical basis for the invention disclosed herein.

The basis for the differential relationships used is the example of a physical system with the following parameters: Transducer (8) range is 0 to +10 volts; reference potential (10) +10 volts; upper limit (18) range +4 to +8 volts; lower limit (19) range +2 to +6 volts; and UL–LL range +2 to +6 volts.

The monitoring device 1 of FIG. 1 has been assumed to be a meter which is capable of being deflected on both sides of a zero reference mark. While it is not necessary, this zero reference mark may conform to the midpoint of a scale on a local meter. The voltage input on the wiper arm of $R_2$ when no current flows in the wiper is:

$$E_{null} = 10\left(\frac{\alpha R_2 + 0.75 R_2}{2.5 R_2}\right) = 4\alpha + 3$$

for the case of reference potential 10 at 10 volts. Substituting the value of $\alpha$ in the above equation:

$$E_{null} = \frac{(UL) + (LL)}{2}$$

Thus, the proper offset or null voltage is provided so that no current flows through the monitoring device 1, when $E_{in}$ is midway between the upper and lower limits of the local meter display 26. It should be clear, at this point, that a local meter is not necessary as a reference since the expected average value of the incoming signal could be chosen or obtained from a meter not associated directly with the remote meter circuit. To cause the remote monitor to reach the limit values at the same value of $E_{in}$ that produce limit readings at the local display, it is now only necessary to provide the proper voltage sensitivity for the remote meter. If $\beta$ is taken to be the unshorted condition of potentiometer $2R_1$, then assume $\beta$ is driven by the differential relationship:

$$\beta = \frac{(UL) - (LL) - 2}{4}$$

Also assuming $R_2$ is small compared to $R_1$, then the source impedance of the offset voltage $E_{null}$ will be small compared to the load $R_1 + 2R_1\beta$. The exact impedance is actually related to $\alpha$ and could be compensated for. In any event, any errors due to impedance changes have little effect on the operation of this circuit arrangement. The basic current relationship through the remote meter display will be:

$$I_m = \frac{E_{in} - E_{null}}{R_1 + \beta(2R_1)} \pm .05 R_2$$

Here the factor $\pm .05 R_2$ represents the maximum error due to $\alpha$. If $R_1 = 20 R_2$, then a maximum error of 0.25% in the source impedance will occur. Neglecting this error and substituting the value of $\beta$ above:

$$I_m = \frac{E_{in} - E_{null}}{\frac{(UL - LL)R_1}{2}}$$

For a monitor 1 having a 100–0–100 microamp meter movement, if the limit boundaries of +50 and −50 microamps for the upper and lower limits respectively, then $R_1$ can be made equal to 20,000 ohms. Substituting this value and the value of $$E_{null} + \frac{(UL) + (LL)}{2}$$

into the equation for $I_m$ the result is:

$$I_m = \frac{E_{in} - \frac{(UL) + (LL)}{2}}{(UL - LL)\frac{20K}{2}}$$

This last equation demonstrates the complete performance of the limit set control operation on the deflection of a monitor 1. Since the numerator will be zero when the input variable is the average value of the limit set values, the meter will be centered whenever the input variable is midway between the limits set. Also, when $E_{in} = (UL)$ then $I_m = +50$ microamps and when $E_{in} = (LL)$, $I_m = -50$ microamps and the network provides the required performance. One outstanding application of the arrangement of this invention is for use with meters remote from hospital beds from which signals are coupled from a transducer on a patient so that variations from a normal can be quickly detected and emergency measures taken if necessary. As shown hereinabove, the circuit arrangement is useful with or without a local display meter. It may be used without a local monitor where the average value of the incoming signal is a relatively standardized parameter. Also, the fact that a scale of fixed length is provided, makes it a simple matter for an observer to detect departures from normal where a plurality of monitoring devices is being observed which may or may not be monitoring different physical parameters.

While I have described above the principles of my invention in connection with specific apparatus, it is to be clearly understood that this description is made only by way of example and not as a limitation to the scope of my invention as set forth in the objects thereof and in the accompanying claims.

I claim:

1. A circuit arrangement for providing variable null and sensitivity conditions at a monitoring device comprising a monitoring device having a scale of fixed length and an indicator, means for applying an electrical signal to said monitoring device, differential means for simultaneously adjusting the null voltage and sensitivity of said monitoring device, said differential means having separate adjusting means for controlling the upper and lower limit value of said scale such that the sensitivity of the monitoring device is inversely proportional to the value of the null voltage.

2. A circuit arrangement for providing variable null and sensitivity conditions at a monitoring device comprising a monitoring device having a scale of fixed length and an indicator, means for applying an electrical signal to said monitoring device, means for adjusting the sensitivity of said monitoring device, means for adjusting a null voltage of said monitoring device, and means for cooperatively varying said sensitivity and null voltage means, said cooperative varying means having separate adjusting means to control the upper and lower limit value of said scale such that as the value of the null voltage decreases the sensitivity of the monitoring device increases.

3. A circuit arrangement according to claim 2 wherein said means for adjusting the sensitivity of said monitoring devices includes a variable resistor for adjusting the current flow through said monitoring device.

4. A circuit arrangement according to claim 2 wherein said means for adjusting the null voltage includes a potentiometer and voltage source to provide voltages proportional to the average value of said input signal.

5. A circuit arrangement according to claim 2 wherein said means for cooperatively varying said adjusting and null voltage means includes differential apparatus adapted to simultaneously vary the null voltage from said potentiometer and the current flow through said resistor so that the sensitivity of the monitoring device varies inversely with the amplitude of the incoming signal.

6. A circuit arrangement according to claim 5 wherein said differential apparatus includes first and second differentials, said first differential having adjusting means which controls the upper limit value of said fixed scale coupled to said variable resistor and said potentiometer such that any increase in the value of the upper limit increases the null voltage and decreases the sensitivity of said monitor, said second differential having adjusting means which control the lower limit value of said fixed scale coupled to said variable resistor and said potentiometer such that any increase in the value of the lower limit decreases the null voltage and increases the sensitivity of said monitoring device.

7. A circuit arrangement for providing a null and sensitivity variation for a monitoring device comprising means for applying an analog signal to said circuit, a remote ammeter having a fixed length of scale between upper and lower limits and an indicator coupled to said first mentioned means for indicating the flow of current through said circuit, a variable resistance coupled to said ammeter to adjust the sensitivity of said ammeter, a voltage divider circuit including a potentiometer coupled to said variable resistance to provide a voltage equal to the average value of said analog signal thereby centering said indicator between said upper and lower limits of said fixed scale, first and second differentials coupled to said variable resistance and said potentiometer and limit setting means for actuating said differentials such that the sensitivity of said meter varies inversely with the amplitude of said analog signal, said first differential actuating said variable resistance and said potentiometer in an additive manner and said second differential actuating said variable resistance and said potentiometer a subtractive manner.

8. A circuit arrangement according to claim 7 wherein said means for applying an analog signal to said circuit includes transducers adapted to sense variations in physical parameters and convert said variations to electrical signals.

References Cited by the Examiner

UNITED STATES PATENTS

| | | | |
|---|---|---|---|
| 2,157,973 | 5/1939 | Wenger | 324—115 |
| 2,691,123 | 10/1954 | Schuck | 318—28 |
| 2,880,393 | 3/1959 | Cornish | 324—115 |
| 2,941,147 | 6/1960 | McKinlay | 324—99 |

WALTER L. CARLSON, *Primary Examiner.*

J. J. MULROONEY, *Assistant Examiner.*